Patented July 3, 1945

2,379,845

UNITED STATES PATENT OFFICE 2,379,845

TREATMENT OF ANIMAL CARCASSES

Beverly E. Williams, Chicago, Ill., assignor to Industrial Patents Corporation, Chicago, Ill., a corporation of Delaware No Drawing. Application June 4, 1941,
Serial No. 396,539

2 Claims. (Cl. 99—174)

This invention relates to the treatment of edible carcasses and has to do particularly with a method of preparing and branding large cuts of animal carcasses.

An object of the invention is to provide a method of marking or branding carcass meat with a paper type brand after chilling and separating the carcass into wholesale cuts.

Another object of the invention is to provide a branding material bearing indicia which may be satisfactorily applied to the chilled, skinned surface of the meat.

A further object of the invention is to provide a means of branding separate cuts of a carcass with branding materials bearing different marks or indicia.

The customary method of branding the chilled wholesale cuts of meat is to apply an ink brand with a stamp or with a needle surfaced branding wheel. However, the ink is easily smeared by rubbing or by moisture. Also when a cloth is placed over the brand the cloth blots the ink and becomes colored and the brand becomes blurred.

It has been proposed heretofore to brand a freshly skinned carcass by applying a Cellophane brand to the warm carcass whereby the natural serum on the moist surface of the meat causes the Cellophane to adhere to the surface. This method is satisfactory for branding freshly skinned carcasses prior to dissipation of the animal heat. The Cellophane, however, will not stick to a chilled carcass, and cannot be used on the wholesale cuts which are separated from the carcass after chilling. Moreover, Cellophane may be easily peeled off from the chilled carcass so that in cutting the chilled branded carcass the Cellophane brand is often removed leaving the cuts unmarked. Also it is often desirable to identify the cuts after they are separated from the chilled carcass, but this cannot be done with Cellophane because it will not stick to such cuts.

It has also been proposed to use tissue paper bearing indicia as a mark for animal carcasses. In the use of tissue, the paper is applied to the warm carcass whereby the paper disintegrates leaving the indicia on the surface of the meat. The tissue paper brand is then covered with a cloth to absorb the moisture and blood and to keep the brand clean. The tissue paper brand has the advantage of firmly adhering to the surface of the carcass meat so that it cannot be readily removed. The tissue, however, must be applied to the moist freshly skinned carcass since it will not adhere to the chilled surface without wetting which causes disintegration and difficulty in application.

In accordance with the present invention, there is applied to the surface of the chilled meat a glassine paper bearing indicia. The invention contemplates the skinning of the carcass, chilling the skinned carcass, cutting the chilled carcass into large cuts and applying to the cuts glassine paper on which is printed the brand or other identifying indicia.

The glassine paper is a semi-transparent non-regenerated cellulose. A material of about 7 pounds long fibre or 10 pounds short fibre may be used. It has a sheen which enables it to be moistened without breaking down and disintegrating. It has sufficient tensile strength so that it can be pressed against the surface of the meat without tearing. The wet fibres adhere firmly to the cold surface of the meat even after drying. The semi-transparent paper makes an excellent background for the indicia.

In practicing the invention, the carcasses of beef, lamb or veal are skinned in the usual manner, with or without the application of a brine cloth on the killing floor. The skinned carcass is removed to the cooler wherein the carcass or sides thereof are chilled over a period of 12 to 48 hours or more at a temperature of around 35° F. The chilled carcass, after removal of the salt cloth, if one has been applied, is cut into sides, quarters or other wholesale cuts. A glassine paper, such as a strip, bearing the desired indicia is moistened and applied to the surface of the cuts. If desired, the surface of the meat may be suitably moistened prior to application of the glassine paper.

The cuts bearing the brand or marks may be covered with a tightly fitting cloth preferably a brine moistened cloth although any ordinary cloth may be used. The cloth protects the paper brand and also preserves the surface of the meat. A salt cloth acts as a wick in causing the absorption and evaporation of moisture between the surface of the meat and the atmosphere. The wicking action of the cloth tends to keep the glassine paper in a substantially moist condition which aids in the adherence thereof to the surface of the meat. The indicia on the paper shows through the cloth and the brand will be visible whether the cloth is on or is removed.

The present invention has the advantage that it provides a method of branding the meat after it has been chilled. This is important since it may not be desirable to mark the whole carcass with the same indicia. For example, the same carcass may produce cuts of different grades and these cuts are advantageously marked after the carcass is chilled and ribbed into quarters or cuts.

The glassine paper can be moistened without disintegration and when moistened readily sticks to the congealed cold surface of the meat. The fibres adhere firmly to the surface making an attractive, tenacious brand which is retained on the meat up to the time it reaches the consumer.

Obviously many modifications and variations of the invention hereinbefore set forth may be made without departing from the spirit and scope thereof, and therefore only such limitations should be imposed as are indicated in the appended claims.

I claim:

1. The method of treating animal carcasses which comprises skinning the carcass, chilling the skinned carcass for about twelve to forty-eight hours at about 35° F. until the animal heat has been dissipated and the surface of the meat has congealed, separating the chilled carcass into wholesale cuts, applying moistened glassine paper bearing identifying marks in intimate contact with the skinned surfaces of the cuts whereby said moistened paper firmly adheres to said surfaces and covering the cuts containing the glassine paper with a brine moistened cloth.

2. The method of treating animal carcasses which comprises: skinning the carcass, chilling the skinned carcass for at least 12 hours at about 35° F. until the animal heat has been dissipated and the surface of the meat has congealed, separating the chilled carcass into wholesale cuts, applying glassine paper bearing identifying marks in intimate contact with the skinned surfaces of the cuts in the presence of moisture whereby moistened glassine paper firmly adheres to said surfaces, and covering the cuts containing the glassine paper with a brine moistened cloth.

BEVERLY E. WILLIAMS.